United States Patent Office 3,723,121
Patented Mar. 27, 1973

3,723,121

PROCESS FOR RECORDING IMAGES WITH LASER BEAMS

William Paul Hauser, Cranbury, N.J., assignor to E. I. du Pont de Nemours and Company, Wilmington, Del.

No Drawing. Filed Nov. 3, 1970, Ser. No. 86,588
Claims priority, application Switzerland, Nov. 1, 1969, 16,307/69
Int. Cl. G03c 5/04, 5/24
U.S. Cl. 96—27 8 Claims

ABSTRACT OF THE DISCLOSURE

A process for laser beam recording by irradiating a layer of a thermochromic material chosen so that under irradiation with a laser of a particular color the material is converted by absorption of incident laser radiation to a color which transmits the incident laser beam so that no further change takes place.

BACKGROUND OF THE INVENTION

This invention relates to laser beam recording, and more particularly to such recording using the heating effect of a laser beam. Still more particularly, it relates to laser beam recording using thermochromic materials. Still more particularly, it relates to securing high resolution laser beam recording by using properly selected thermochromic materials.

It is known to record laser beams by their heating effect on materials. The great heat available when the laser beam is focused to a small spot can be used to change the properties of many materials to make a record.

However, in previous methods, the record is produced by charring, melting, evaporation, or other severe modifications of the physical properties of the recording material. Furthermore, the heat generally tends to be conducted to adjacent unexposed areas of the recording surface, causing a spreading of the recorded trace with consequent loss of resolution.

THE PRIOR ART

There are many references in the chemical literature and patents disclosing the preparation and use in image-forming processes of various photosensitive, crystalline, polyacetylenic compounds. These compounds contain a minimum of two acetylenic linkages in a conjugated chain of atoms, i.e., —C≡C—C≡C—, the carbon atoms directly connected to the acetylenic carbon atoms in the compounds, as a general rule, are attached directly only to carbon and/or hydrogen atoms. Among the useful polyacetylenic compounds are the alkyl esters of dicarboxylic-terminated diacetylenic compounds of 16–26 carbon atoms, wherein the alkyl radicals are methyl or ethyl. Suitable esters are listed in Foltz 3,501,303 and Cremeans 3,501,297, Mar. 17, 1970, and in the literature references described in said U.S. patents. Foltz and Trent 3,501,302 discloses useful polyacetylenic compounds, including alkali metal salts of polyacetylenic hydrocarbon compounds.

In Adelman 3,501,308, there are listed photosensitive, crystalline, polyacetylenic compounds which are esters of diynedioic acids for various image-forming processes.

Thermochromic image-forming procedures using radiant or conductive heat are known. Laser beam recording using the thermal effects of a laser beam to melt, change, evaporate or otherwise modify the physical properties of a recording medium is also known.

The prior art, however, is not believed to disclose the novel process of this invention, wherein a laser beam is used to record in thermochromic material which, in its unexposed state, absorbs, but in its exposed state, transmits the beam.

SUMMARY OF THE INVENTION

It is an object of this invention to provide an improved method of laser beam recording. A further object is to provide a method of using thermochromic materials for laser beam recording. A still further object is to provide a method of laser beam recording using thermochromic materials which change when heated to a color which does not absorb the exposing beam. The photosensitive, crystalline, polyacetylenic compounds described above constitute useful precursors which can be converted into useful materials by first uniformly exposing them to actinic radiation where they are changed to a different state. Useful actinic radiation is electromagnetic radiation in the ultraviolet, visible, and infrared regions of the spectrum.

The process of this invention consists essentially in exposing to the radiation of a laser beam an element having a layer comprising a photosensitive, thermochromic material chosen so that the unexposed state of the material absorbs the laser light, but the exposed state transmits it. Since the thermochromic material in its unexposed state absorbs laser light energy, it is rapidly heated until it reaches the temperature required to convert it into its exposed state. The exposed state then transmits any further laser light which strikes the element so that the element is not heated further. This permits high resolution recording, for no excess heat is imparted to the element which might be conducted to adjacent unexposed parts of the element and convert this material to the exposed form. Furthermore, the changes are produced by relatively low temperatures so that no dangerous or inconvenient high temperatures are used in this recording method.

DESCRIPTION OF THE PREFERRED EMBODIMENTS

Any laser beam providing radiation in a visible region of the spectrum can be used for this recording process provided it can deliver several milliwatts of beam power. Thus, crystalline or amorphous solid pulsed or continuous wave lasers such as ruby or neodymium—doped glass lasers may be used. Gas lasers radiating in the visible region of the spectrum such as helium-neon, argon-ion, or krypton-ion lasers are also useful provided that they produce several milliwatts of beam power. Solid state injection lasers are also suitable provided that they emit in the visible portion of the spectrum.

The thermochromic material to be used as the sensitive element in this process should be chosen so that in its unexposed state it absorbs the laser radiation while in its exposed state it transmits said radiation. For maximum sensitivity the thermochromic material should preferably undergo the transition from the unexposed to the exposed state at a temperature only slightly above room temperature. Compounds undergoing this transition in the temperature range of 30° to 80° C. are especially useful. Compounds with higher transition temperatures may be used if a higher-powered laser is used for exposing.

Preferred thermochromic compounds are those formed by exposing to ultra-violet radiation the radiant-energy-sensitive crystals of mono- or di- esters of docosadiynedioic acids. These compounds have a dark blue color and, hence, are useful for imaging with red, yellow, or green lasers. They undergo two thermochromic changes, changing first to a red state at somewhat elevated temperatures, then to a yellow state at still higher temperatures.

Compounds which undergo a chemical transformation, e.g., a decomposition, with accompanying color change may also be used for laser beam recording. Red mercury (II) iodide which is converted to the yellow state, black copper (II) oxide, which decomposes to red copper (I) oxide, and yellow vanadium pentoxide which decomposes to blue vanadium tetroxide are examples of useful compounds of this type.

In practicing this invention, a sensitive element comprising a thermochromic compound is irradiated with a laser beam having a color which is absorbed by the unexposed state of the sensitive material, but not by the exposed state. Where struck by the laser beam, the element is rapidly converted to the color which does not absorb the laser light. The resulting mark is well defined and may be made very small if the diameter of the laser beam striking the element is correspondingly small.

The element generally comprises a layer of the thermochromic material on a support. The thermochromic material may be used alone to form the layer or it may be dispersed in finely divided form in a macromolecular, film-forming, organic polymer binder, e.g., a water-permeable organic colloid. The binder must allow the thermochromic material to be dispersed at low temperatures and must be capable of being coated in a thin layer, either self-supporting or preferably on a suitable support, at low temperatures and must be transparent to light of the color used for recording. Preferred binders are gelatin and polyvinyl alcohol. Other suitable binders are the polymerized vinyl compounds and mixtures with gelatin described in Nottorf U.S. Pat. 3,325,286, June 13, 1967.

The support for the thermochromic layer used in the novel process may be any suitable transparent or reflective material. Glass, rigid transparent plastic, and polished metal plates or foils are suitable supports. Particularly preferred supports are transparent polymer films. For example, cellulose derivatives, e.g., cellulose propionate, cellulose triacetate, cellulose acetate butyrate, form useful films. Polymerized vinyl compounds, e.g., copolymerized vinyl acetate and vinyl chloride, polystyrene, and polymerized acrylates form useful films and matrices. The film formed from the polyesterification product of a dicarboxylic acid and a dihydric alcohol made according to the teachings of Alles, U.S. Pat. 2,779,684, and the patents referred to in the specification of that patent, is suitable. Other suitable supports are the polyethylene terephthalate/isophthalates of British Pat. 766,290 and Canadian Pat. 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. 3,052,543, may also be used. The above polyester films are particularly suitable because of their dimensional stability.

By the process of this invention, clear, sharp traces of laser beams may be produced in several different colors depending on the choice of laser and material. In this way, the process of this invention may be used as a read-out for a high-speed recording oscillograph.

The following examples illustrate the practices of this invention, but are not intended to limit its scope.

EXAMPLE I

In a mixture of 20 ml. of isopropanol and 10 ml. of acetone, 4 g. of the monomethyl ester of docosadiyne-10, 12-dioic acid (Example N of French Pat. 1,525,738) were dissolved. The solution was added to a solution containing 7.5 g. of gelatin and 0.5 ml. of nonylphenoxypolyethoxyphosphate, in 100 ml. of water and kept at 75° C. The solution was kept above 62° C. while an emulsion was formed by rapid stirring. The solution was skim-coated at 36 ft./min. at a temperature of about 79° C. on a polyethylene terephthalate film and allowed to dry in air.

Samples of the colorless element so prepared were exposed uniformly to ultraviolet radiation until the element turned a deep blue.

The element was then exposed with one flash of an unfocused ruby laser operated at a power output of 2 j. and emitting at a wavelength of 694 nm. The blue element turned red where struck by the laser beam. Similar conversion from blue to red occurred when the element was exposed to the focused beam of a krypton-ion laser emitting at 647 nm. at a power of 195 mw. for $\frac{1}{1000}$ sec. and the focused beam of a helium-neon laser emitting at 633 nm. at a power of 50 mw. for $\frac{1}{125}$ sec. The red, exposed form of the dioic acid ester transmitted the laser beam. In each case, the spot was small and well-defined.

EXAMPLE II

Samples of the element of Example I were exposed to the unfocused beam of an argon-ion laser emitting at a wavelength of 515 nm. with a power of 0.650-watt for $\frac{1}{60}$ sec., the focused beam of a krypton-ion laser emitting at 521 nm. with a power of 0.140-watt for $\frac{1}{250}$ sec., and the focused beam of a krypton-ion laser emitting at 568 nm. with a power of 60 mw. for $\frac{1}{60}$ sec. In each case, the exposed spot was converted to a small, well-defined red spot. Longer exposures produced a small, well-defined yellow spot surrounded by a red ring, and no further change occurred with still longer exposure.

EXAMPLE III

A sample of the blue element of Example I was exposed to the focused beam of a krypton-ion laser emitting at 4765 A. with a beam power of 40 mw. for different durations. The results of these exposures are tabulated in Table I.

TABLE I

| Exposure (secs.) | Size of spot (microns) | Color of spot |
|---|---|---|
| 0.001 | 80 | Red. |
| 0.002 | 125 | Red. |
| 0.008 | 240 | Yellow center, red ring. |
| 0.033 | 330 | Do. |
| 1.00 | 1,000 | Charred center, yellow and red rings. |

EXAMPLE IV

Example III was repeated using the green 5203 A. line from the krypton laser (beam power 73 mw.) to expose the element. Results are tabulated in Table II.

TABLE II

| Exposure (secs.) | Size of spot (microns) | Color of spot |
|---|---|---|
| 0.001 | 90 | Red. |
| 0.002 | 175 | Yellow center, red ring. |
| 0.008 | 250 | Do. |
| 0.033 | 330 | Do. |
| 1.00 | 900 | Do. |

No charring of the element was observed.

EXAMPLE V

Several fatty acid diesters of a diynediol were made having the formulas $$CH_3(CH_2)_x-\overset{\displaystyle O}{\overset{\|}{C}}-O-CH_2-C\equiv C-C\equiv C-CH_2-O-\overset{\displaystyle O}{\overset{\|}{C}}-(CH_2)_xCH_3$$

where $x$ was 7, 8, 9, 10, 11 and 12.

2.0 g. of 1,6-hexadiynediol were dissolved in 20 ml. of pyridine. With the temperature kept below 10° C., 10 g. of the appropriate acid chloride were added dropwise. The mixture was allowed to warm to room temperature, then was extracted with ether and water. The ether phase was stirred successively with sodium bicarbonate and anhydrous sodium bicarbonate. The ether was evaporated and the ester recovered as the residue. Table III shows the compounds prepared and their melting points.

TABLE III

| Compound: | Melting point, C. ° |
|---|---|
| 1,6-hexadiynediol dioctanoate | 31 |
| 1,6-hexadiynediol dinonanoate | 35 |
| 1,6-hexadiynediol didecanoate | 45 |
| 1,6-hexadiynediol diundecanoate | 49 |
| 1,6-hexadiynediol dilaurate | 54 |
| 1,6-hexadiynediol ditridecanoate | 59 |

Photosensitive layers containing each of these diesters were prepared by the procedure of Example I. Each was uniformly exposed to ultraviolet radiation to produce a yellow, heat-sensitive layer. Each sample was then tested by exposing to laser radiation according to the procedures of Examples I and II. In each case, a red laser produced a red spot, while a green or yellow laser beam produced a red spot for short exposures and a yellow spot for longer exposures.

EXAMPLE VI

To 10 g. of a 10% aqueous gelatin solution were added 2.0 g. of copper (II) oxide. The mixture was stirred for ½ hour at a temperature of 60° C. The dispersion was then cast on a 2" x 3" glass plate and allowed to dry. Samples of this element were exposed to the red focused beam of a ruby laser operated at 2 j. per flash and to the focused red beam of a krypton-ion laser operated at a wavelength of 647 nm. with a beam power of 195 mw. for 1 sec. In each case the black copper (II) oxide was converted to red copper (I) oxide and additional exposure produced no further change.

EXAMPLE VII

A dispersion of yellow vanadium pentoxide in gelatin was prepared by stirring 2.0 g. of vanadium pentoxide in 10 ml. of a warm 10% aqueous gelatin solution. The dispersion was cast on a glass plate and allowed to dry. The layer was exposed to the unfocused blue beam of an argon ion laser emitting at a wavelength of 488 nm. and operated at a power output of 0.650 w. for 10 sec. The exposed yellow vanadium pentoxide was converted to the blue vanadium tetroxide ($V_2O_4$) and additional exposure produced no further change.

EXAMPLE VIII

A dispersion of red mercury (II) iodide in polyvinyl alcohol was prepared by mixing 2.5 g. of mercury (II) iodide with 10 ml. of a 10% aqueous solution of polyvinyl alcohol and stirring for ½ hour at 60° C. The dispersion was cast on a glass plate and allowed to dry. The layer was exposed to the focused beam of an argon-ion laser emitting at 515 nm. with a beam power of 0.60 watt for 1 sec. The exposed red mercury (II) iodide was converted to the yellow form which transmitted the laser beam so that additional exposure produced no further change. The yellow spot formed by laser exposure was small and well-defined.

The embodiments of the invention in which an exclusive property or privilege is claimed are defined as follows:

1. A process for laser beam recording in an imagewise fashion which comprises exposing to the radiation of a laser beam having radiation in the visible region of the spectrum, an element having a layer comprising a colored, thermochromic material which in its unexposed form absorbs the laser beam to produce a thermochromic change, and in its exposed form transmits the laser beam whereby the laser beam has no further substantial effect on the element.

2. A process according to claim 1 wherein said thermochromic material undergoes its thermochromic transistion in the temperature range of about 30° to 80° C.

3. A process according to claim 1, wherein the thermochromic material is a photosensitive, crystalline, polyacetylenic compound having a minimum of two acetylenic linkages as a conjugated system, which compound has been converted to a different state by uniform exposure to actinic radiation.

4. A process according to claim 1, wherein the thermochromic material is a photosensitive, crystalline alkyl ester of a dicarboxylic-terminated diacetylenic compound which contains 16–26 carbon atoms and the alkyl radical is methyl or ethyl, which compound has been converted to a different state by uniform exposure to actinic radiation.

5. A process according to claim 1, wherein the thermochromic material is a photosensitive, crystalline diester of a diynediol of the formula:

$$R\overset{O}{\overset{\|}{C}}-O-CH_2-C\equiv C-C\equiv C-CH_2-O-\overset{O}{\overset{\|}{C}}-R$$

where R is an n-alkyl radical of 8–13 carbon atoms, which compound has been converted to a different state by uniform exposure to actinic radiation.

6. A process according to claim 1, wherein said layer comprises a water-permeable macromolecular organic colloid and a thermochromic compound which in the unexposed state absorbs, but in the exposed state, transmits the beam.

7. A process according to claim 1, wherein said layer comprises gelatin and a thermochromic compound which in the unexposed state absorbs, but in the exposed state, transmits the laser beam.

8. A process according to claim 1, wherein the element has a flexible polymer film support that transmits visible radiation.

References Cited

UNITED STATES PATENTS

| | | | |
|---|---|---|---|
| 3,501,297 | 3/1970 | Cremeans | 96—48 |
| 3,501,302 | 3/1970 | Foltz | 96—88 |
| 3,501,303 | 3/1970 | Foltz el al. | 96—88 |
| 3,501,308 | 3/1970 | Adelman | 96—88 |
| 3,314,073 | 4/1967 | Becker | 96—27 H |
| 3,584,934 | 6/1971 | French | 252—300 |

J. TRAVIS BROWN, Primary Examiner

E. C. KIMLIN, Assistant Examiner

U.S. Cl. X.R.

96—88, 48

PO-1050
(5/69)

UNITED STATES PATENT OFFICE
CERTIFICATE OF CORRECTION

Patent No. 3,723,121 Dated March 27, 1973

Inventor(s) William Paul Hauser

It is certified that error appears in the above-identified patent and that said Letters Patent are hereby corrected as shown below:

Column 1, lines 7 and 8, delete "Claims priority, application Switzerland, Nov. 1, 1969, 16,307/69".

Signed and sealed this 5th day of November 1974.

(SEAL)
Attest:

McCOY M. GIBSON JR.
Attesting Officer

C. MARSHALL DANN
Commissioner of Patents